United States Patent [19]

Kimura et al.

[11] Patent Number: 4,664,976
[45] Date of Patent: May 12, 1987

[54] MAGNETIC RECORDING MEDIUM COMPRISING A PROTECTIVE CARBON NITRIDE LAYER ON THE SURFACE THEREOF

[75] Inventors: Akihiro Kimura, Sagamihara; Toshio Ando, Fujisawa; Toshikazu Nishihara, Zama; Toshio Kato, Yamato, all of Japan

[73] Assignee: Victor Company of Japan, Ltd., Japan

[21] Appl. No.: 738,757

[22] Filed: May 29, 1985

[30] Foreign Application Priority Data

May 30, 1984 [JP] Japan .................................. 59-108608

[51] Int. Cl.$^4$ ............................ G11B 5/64; G11B 5/72
[52] U.S. Cl. .................................. 428/336; 427/131; 427/132; 428/694; 428/900
[58] Field of Search ............... 428/332, 694, 698, 900, 428/693, 408, 336; 427/131, 132

[56] References Cited

U.S. PATENT DOCUMENTS

| | | | |
|---|---|---|---|
| 3,771,976 | 11/1973 | Wakefield | 428/698 |
| 4,035,541 | 7/1977 | Smith et al. | 428/698 |
| 4,411,963 | 10/1983 | Aine | 428/900 |
| 4,495,242 | 1/1985 | Arai et al. | 427/39 |
| 4,503,125 | 3/1985 | Nelson et al. | 427/132 |

FOREIGN PATENT DOCUMENTS 0167134  10/1982  Japan .................................. 428/328

Primary Examiner—Paul J. Thibodeau
Attorney, Agent, or Firm—Lowe, Price, LeBlanc, Becker & Shur

[57] ABSTRACT

A magnetic recording medium of the type which comprises a non-magnetic support, and a thin magnetic metal layer formed on at least one surface of the support is described. The magnetic metal layer is protected with a carbon nitride layer.

5 Claims, 1 Drawing Figure

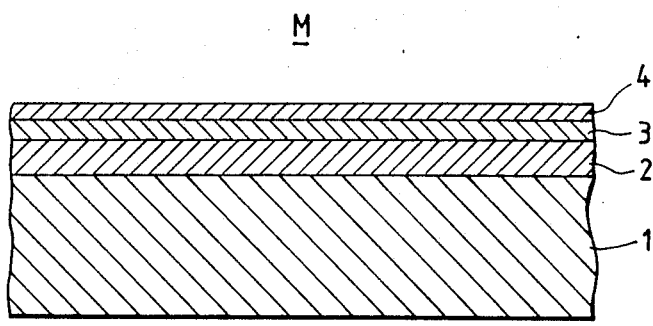

MAGNETIC RECORDING MEDIUM COMPRISING A PROTECTIVE CARBON NITRIDE LAYER ON THE SURFACE THEREOF

BACKGROUND OF THE INVENTION

1. Field of the Invention

This invention relates to magnetic recording mediums such as, for example, magnetic disks having a thin metallic recording layer on the surface thereof.

2. Description of the Prior Art

Recent advances in the magnetic recording and reproducing apparatus are remarkable. These advances require high performance of magnetic recording mediums adapted for use in magnetic recording and reproducing apparatus. In order to meet these requirements, there have been proposed a number of magnetic recording mediums comprising thin metallic recording layers without use of any binder resins. This type of magnetic recording medium is ordinarily made by depositing under vacuum or sputtering ferromagnetic metal materials such as Co, Co-Ni alloys, Co-Cr alloys and the like, or non-magnetic supports such as sheets of polyethylene terephthalate, polyimides and the like.

However, although the magnetic material is packed in high density because no binder resins are present in the thin metallic layer, the magnetic layer shows a high frictional resistance when travelled on contact with hard magnetic heads, drums, guides and the like. This will cause the magnetic thin layer to be damaged. In an extreme case, the magnetic thin layer may partially come off. In addition, the magnetic layer is exposed, so that it tends to corrode on the surface thereof.

SUMMARY OF THE INVENTION

It is accordingly an object of the invention to provide a magnetic recording medium in which a specific type of material is used as a protective layer for the thin magnetic metal layer of the medium.

It is another object of the invention to provide a magnetic recording medium which has good wear resistance, still reproduction characteristics and corrosion resistance.

According to the present invention, there is provided a magnetic recording medium which comprises a non-magnetic support, and a thin magnetic metal layer on at least one surface of the support. On the magnetic metal layer is formed a protective carbon nitride layer.

BRIEF DESCRIPTION OF THE DRAWING

A sole FIGURE is a schematic sectional view of a magnetic recording medium according to the present invention.

DETAILED DESCRIPTION AND EMBODIMENTS OF THE INVENTION

Reference is now made to the sole FIGURE, in which there is generally shown a magnetic recording medium M. The medium M includes a non-magnetic support 1 such as a sheet of an aluminum alloy, polyethylene terephthalate, or the like. The support 1 may have an undercoat layer 2 on the surface thereof. The undercoat layer is formed on the support 1, for example, by any known techniques including plating of Ni-P, anodization of Al in the form of Al$_2$O$_3$, or vacuum deposition or sputtering of Cr. The thickness of the undercoat layer 2 is generally in the range of from 0.05 to 20.0 μm. On either the support 1 or the undercoat layer 2 is formed a thin magnetic metal layer 3 by plating or sputtering in a thickness of from 0.03 to 2.0 μm as is known in the art. The magnetic metal layer 3 may be made of various metals or alloys thereof including, for example, Co, Co-Ni alloys, Co-Cr alloys, Ni-Co-P alloys, and the like.

The support 1, the undercoat layer 2 and the magnetic metal layers 3 may be, respectively, made of various other materials ordinarily used for these purposes without limitations.

According to the present invention, the magnetic metal layer 3 is covered with a protective carbon nitride layer 4. The protective layer 4 is formed by the use of a sputtering apparatus in which a carbon target is applied with RF power in an atmosphere of nitrogen gas while heating the substrate to a temperature of from 50° to 250° C. The carbon nitride is formed in a thickness of from 0.02 to 0.15 μm. If the thickness is below 0.02 μm, the resistance to friction and corrosion are not improved significantly. On the other hand, when the thickness exceeds 0.15 μm, magnetic recording characteristics deteriorate because the recording head is kept apart from the magnetic recording layer. The thickness may be arbitrarily controlled by controlling the sputtering time.

The carbon nitride in the protective layer should preferably have an atomic ratio of carbon to nitrogen of 4:1 to 3:2, when determined by Auger's analysis technique, as will be particularly described in the examples. The atomic ratio can be varied chiefly by the pressure of nitrogen gas in the sputtering atmosphere and RF power. A higher pressure of nitrogen gas results in a higher ratio of nitrogen in the carbon nitride. On the contrary, higher RF power results in a higher content of carbon atom in the carbon nitride layer. Accordingly, the atomic ratio is suitably controlled by controlling the pressure of nitrogen gas and the RF power. The pressure of the nitrogen gas in the atmosphere is usually in the range of from 5.0 mTorr. to 40.0 mTorr.

The magnetic recording medium of the invention may be in the form of a disk, card, or tape. The magnetic recording layer and the protective layer may be formed on one side or opposite sides of the medium.

The present invention is more particularly described by way of examples.

EXAMPLE 1

An aluminum alloy disk support was provided and plated with 10 wt% Ni-P to form a 15.0 μm thick undercoat layer on one surface of the support. Ni-Co-P was then plated on the Ni-P plated undercoat layer in a uniform thickness of about 0.06 μm in the conventional manner.

The thus plated disk was subsequently placed in an RF magnetron sputtering apparatus in which RF power was applied to a carbon target in an atmosphere of nitrogen gas of about 10 mTorr., while heating the disk to about 100° C., in such a way that about 0.05 μm thick carbon nitride layer is form on the Ni-Co-P layer. The Auger analysis revealed that the carbon nitride layer had a carbon to nitrogen atomic ratio of 3:1.

The above procedure was repeated except that no carbon nitride layer was formed.

These disks were each subjected to a contact-start-stop (hereinafter abbreviated as CSS) test using a disk drive system. As a result, it was found that the magnetic disk having no carbon nitride layer lowered by 5 dB with respect to the reproduction output level when subjected to 1000 cycles of CSS and involved head crushing at 3000 cycles of CSS. On the contrary, the magnetic disk of the invention, which had the carbon nitride layer on the surface thereof, involved little lowering of the reproduction output level after 10,000 cycles of CSS.

The two disks were further subjected to a corrosion test in which each disk was cut to give a 6 mm×6 mm test piece and allowed to stand for 2 weeks under conditions of a temperature of 40° C. and a relative humidity of 90%. Thereafter, the pieces were observed through an optical microscope on the surface thereof, revealing that no rust was recognized on the surface of the test piece on which the carbon nitride layer was formed. However, the test piece having no carbon nitride layer was rusted on the surface thereof.

Moreover, the disks were subjected to magnetic measurement using a sample-vibrating magnetometer. As a consequence, it was found that the medium having no carbon nitride lowered by 5% with respect to the intensity of magnetization. On the contrary, little lowering of the magnetization was found in the medium of the invention.

The procedure of Example 1 was repeated except that a carbon layer was formed instead of the carbon nitride layer, thereby obtaining a magnetic disk. The thus obtained disk and the disk of Example 1 were allowed to stand under conditions of a normal temperature and a relative humidity of 90% for two days. As a result, it was found that the disk of the invention had small irregularities on the surface thereof. However, with the magnetic disk having the carbon layer on the surface, irregularities were seen because the carbon layer partially came off. Thus, the magnetic disk having the protective layer of carbon nitride was much more durable than the disk having the carbon layer.

It was also confirmed that the durability was kept high when the carbon nitride layer had an atomic ratio between carbon and nitrogen of 4:1 to 3:2.

EXAMPLE 2

A non-magnetic support of the same type as used in Example 1 was provided, on which an about 0.05 $\mu$m thick magnetic layer of 20 wt% Co-Cr alloy was formed by the use of an RF magnetron sputtering apparatus. Thereafter, nitrogen gas was introduced into the sputtering apparatus in an amount corresponding to about 10 mTorr., followed by applying RF power to a carbon target, as usual, to form an about 0.05 $\mu$m thick carbon nitride layer on the magnetic layer. Thus, a magnetic disk of the invention was made.

The above procedure was repeated for comparison except that no carbon nitride layer was formed.

These disks were subjected to the CSS test in a hard disk drive system, revealing that the reproduction output level of the magnetic disk for comparison lowered by 5 dB after 2000 cycles of CSS, and head crush took place at the 7000th cycle of CSS. On the other hand, the magnetic disk of the invention involved little lowering of the reproduction output level after 10,000 cycles of CSS.

What is claimed is:

1. In a magnetic recording medium which comprises a non-magnetic support, and a thin magnetic metal layer formed on at least one surface of the support, the improvement comprising a protective layer formed on said magnetic metal layer and consisting essentially of carbon nitride.

2. A magnetic recording medium according to claim 1, wherein said protective layer has an atomic ratio of carbon to nitrogen of 4:1 to 3:2.

3. A magnetic recording medium according to claim 1, wherein said protective layer has a thickness of from 0.02 to 0.15 $\mu$m.

4. A magnetic recording medium according to claim 1, further comprising an undercoat layer provided between said non-magnetic support and said at least one magnetic metal layer.

5. A magnetic recording medium according to claim 1, wherein said medium is a magnetic disk.

* * * * *